UNITED STATES PATENT OFFICE.

EDWARD FINK, OF MILWAUKEE, WISCONSIN.

PROCESS OF EXTRACTING COPPER OR OTHER METALS FROM TAILINGS OR ORES OF SUCH METALS.

SPECIFICATION forming part of Letters Patent No. 653,414, dated July 10, 1900.

Application filed September 23, 1899. Serial No. 731,463. (No specimens.)

*To all whom it may concern:*

Be it known that I, EDWARD FINK, a citizen of the United States, residing at Milwaukee, in the county of Milwaukee and State of Wisconsin, have invented a certain new and useful Process of Extracting Copper or Other Metals from Tailings or Ores of Such Metals, of which the following is a specification.

The main object of my invention is to expeditiously and economically extract copper and other metals from tailings and ores containing such metals.

I have discovered that copper and other metals can be extracted from tailings or ores both rapidly and economically by subjecting the tailings or ores to the action of a solution containing sulfuric acid and some substance or substances capable of liberating nitric oxid either through its or their action upon the sulfuric acid alone or through the combined action of such substances upon sulfuric acid and metallic copper or sulfid of copper. The substances best adapted for this purpose are metallic nitrates, nitrites, or free nitric or nitrous acid.

In case a nitrate is used in the treatment of tailings or ores containing metallic copper the chemical reactions are expressed by the following equation:

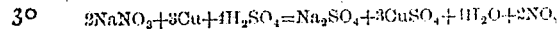
$$2NaNO_3 + 3Cu + 4H_2SO_4 = Na_2SO_4 + 3CuSO_4 + 4H_2O + 2NO,$$

and in case a nitrate is used in treating tailings or ores containing sulfid of copper the chemical reactions are expressed in the following equation:

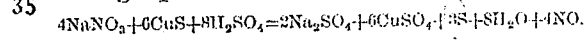
$$4NaNO_3 + 6CuS + 8H_2SO_4 = 2Na_2SO_4 + 6CuSO_4 + 3S + 8H_2O + 4NO.$$

The nitric oxid formed upon coming in contact with air is at once oxidized and converted into a higher oxid or oxids, principally to nitrogen peroxid, ($NO_2$.)

The foregoing reactions may be expressed by the following equation:

$$2NO + O_2 = 2NO_2.$$

In the presence of moisture these higher oxids rapidly corrode copper and other metals or metallic sulfids and are themselves reduced to nitric oxid. It is probable that at least a portion of the nitrogen peroxid is converted to a mixture of nitric and nitrous acids upon coming in contact with moisture, according to the reactions expressed in the following equation:

$$2NO_2 + H_2O = HNO_3 + HNO_2.$$

These acids, if produced, will act upon the copper or other metal in the usual manner. In any event the nitric oxid formed is alternately oxidized and reduced or reconverted into nitric oxid and is thus rendered capable of oxidizing a large amount of copper or other metal, thereby making the process a continuous one. The foregoing operations are preferably performed in a closed or substantially-closed vessel containing an excess of air at or above atmospheric pressure. The relative quantities of sulfuric acid and nitrate, nitrite, or free nitric or nitrous acid required depend upon the percentage of copper or other metal contained in the tailings or ore, as well as upon the nature of the tailings or ores themselves. For tailings or ore containing one per cent. of copper the following proportions per ton of tailings or ore have proved very efficient and satisfactory: sulfuric acid, thirty pounds; sodium nitrate, five pounds; water, fifty pounds. The sulfuric acid and water are first mixed, preferably in the vessel containing the ore, and the sodium nitrate is then added. The action of the sulfuric acid upon the water produces sufficient heat to cause a very rapid oxidation of the copper upon the addition of the nitrate or nitrite, and it is desirable to keep the mixture at a temperature of from 60° to 100° Fahrenheit, as this temperature is sufficient to cause a rapid solution of the copper. The desired temperature may be produced and maintained by means of a steam jacket or coil or by other suitable means. The tailings or ore is preferably subjected alternately to the oxidizing influence of the fumes of the peroxid or higher oxids of nitrogen and to the solvent action of the sulfuric acid, and to this end the process may be conveniently performed in a rotary drum or apparatus, by which the tailings or ore will be successively immersed in the solution and subjected to the action of the nitrous fumes confined above the solution, since the copper contained in the tailings or ore is more rapidly oxidized and dissolved in this way than it would be if it were contained in a stationary receptacle. Any other form of apparatus suitable for securing the results above mentioned may, however, be employed.

When the metal contained in the tailings or ore has been oxidized and dissolved in the solution, as above explained, the solution is decanted and the contents of the vessel or receptacle leached out with water. The sulfate of copper contained in the combined solutions is then precipitated with metallic iron in the usual way or by any other or well-known method. Before the drum or receptacle in which the first steps of the process are performed is opened the remaining gases or nitrous fumes confined therein are preferably conducted into another drum or receptacle in which other tailings or ore is about to be treated, or they may be forced into a solution of caustic soda, by which they will be absorbed, thus forming sodium nitrate or nitrite, or a mixture of both, which may be utilized at any time in the initial treatment of other tailings or ores.

I have explicitly described my improved process more particularly with respect to the treatment of copper tailings and ores; but it may be advantageously employed in the treatment of tailings or ores of other metals.

I claim—

1. The process of extracting copper and other metals from tailings or ores of such metals, which consists in subjecting the tailings or ore to the action of a solution containing sulfuric acid and to the action of an oxid or oxids of nitrogen, in the presence of air or oxygen under pressure, whereby the metal is oxidized and dissolved and the oxid or oxids of nitrogen are converted alternately into a lower and a higher oxid or oxids, and finally separating the solution from the earthy matter of the tailings or ore and separating the metal from the solution, substantially as and for the purposes set forth.

2. The process of extracting copper and other metals from tailings or ores of such metals, which consists in subjecting the tailings or ore to the action of a solution containing sulfuric acid and to the action of an oxid or oxids of nitrogen confined in the presence of the solution, whereby the metal contained in the tailings or ore is oxidized and dissolved, supplying air or oxygen under pressure to the nitrous fumes from which oxygen has been taken by the metal, and reconverting them into a higher oxid or oxids to be again reduced to a lower oxid or oxids by acting on the tailings or ores, until the metal is extracted therefrom, and finally separating the earthy matter and the metal from the solution, substantially as and for the purposes set forth.

3. The process of extracting copper and other metals from tailings or ores containing such metals, which consists in subjecting the tailings or ore alternately to the action of a solution containing sulfuric acid and to the action of an oxid or oxids of nitrogen confined in the presence of the solution and capable of oxidizing the metal contained in the tailings or ore, supplying air or oxygen under pressure to the nitrous fumes from which oxygen has been taken and thereby reconverting them into a higher oxid or oxids to further act on the tailings or ore, until the metal is dissolved in the solution, and finally separating the matrix or earthy matter and the metal from the solution, substantially as and for the purposes set forth.

4. The process of extracting copper and other metals from tailings or ores containing such metals, which consists in subjecting the tailings or ore to the action of a solution containing sulfuric acid and to the action of a corrosive oxid of nitrogen, confining the nitrous fumes given off by the solution in the presence of the solution and supplying air or oxygen under pressure to such fumes, whereby they are converted into a higher oxid or oxids capable of again imparting oxygen to the metal contained in the tailings or ore until the metal is extracted therefrom and dissolved in the solution, separating the matrix or earthy matter and the metal from the solution, and finally utilizing the remaining nitrous fumes for treating other tailings or ore, substantially as and for the purposes set forth.

5. The process of extracting copper and other metals from tailings or ores containing such metals, which consists in subjecting the tailings or ore to the action of a solution containing sulfuric acid and a substance capable of liberating nitric oxid, confining the nitrous fumes given off from the solution in the presence of the solution, supplying air or oxygen under pressure to such fumes whereby the lower oxids are repeatedly converted into the higher oxids of nitrogen capable of imparting oxygen to the metal contained in the tailings or ore and the process is rendered continuous, until the metal has been dissolved in the solution, and finally separating the matrix or earthy matter and the metal from the solution, substantially as and for the purposes set forth.

6. The process of extracting copper and other metals from tailings or ores containing such metals, which consists in subjecting the tailings or ore alternately to the action of a solution containing sulfuric acid and a substance capable of liberating nitric oxid, and to the action of nitrous fumes given off by and confined in the presence of such solution, supplying air or oxygen under pressure to such fumes and thereby converting them to a higher oxid or oxids before and after they act upon and impart oxygen to the tailings or ore, and finally after the metal is extracted from the tailings or ore and dissolved in the solution, separating the matrix or earthy matter and the metal from the solution, substantially as and for the purposes set forth.

7. The process of extracting copper and other metals from tailings or ores containing such metals, which consists in subjecting the tailings or ore to the action of a solution containing sulfuric acid and a substance capable of liberating nitric oxid and to the action of nitrous fumes given off by and confined in the presence of the solution, supplying air or oxygen under pressure to such fumes thereby converting and repeatedly restoring them to higher oxids capable of imparting oxygen to the tailings or ore until the metal is extracted therefrom, separating the matrix or earthy material and the metal from such solution, and finally conducting off the remaining nitrous fumes for treating other tailings or ore, substantially as and for the purposes set forth.

8. The process of extracting copper from tailings or ores of that metal, which consists in subjecting the tailings or ore to the action of a solution containing sulfuric acid and primarily a compound of nitrogen, capable of liberating nitric oxid, and to the action of a higher oxid or oxids produced and repeatedly reproduced by supplying air or oxygen under pressure to the liberated nitric oxid and to the higher oxid or oxids which have been reduced by acting on the tailings or ore and are confined in the presence of the solution until the metal contained in the tailings or ore is dissolved in the solution; separating the matrix or earthy matter from the solution, and separating and precipitating the copper from the solution, substantially as and for the purposes set forth.

9. The process of extracting copper from tailings or ores containing that metal, which consists in subjecting the tailings or ore alternately to the action of a solution containing sulfuric acid and primarily a compound of nitrogen, capable of liberating nitric oxid, and to the action of a higher oxid or oxids produced and repeatedly reproduced by supplying air or oxygen under pressure to the liberated nitric oxid and to the higher oxid or oxids which have been reduced by acting on the tailings or ore and are confined in the presence of the solution until the metal contained in the tailings or ore is dissolved in the solution, then separating the matrix or earthy matter from the solution, and finally separating and precipitating the copper from the solution, substantially as and for the purposes set forth.

10. The process of extracting copper from tailings or ores containing that metal, which consists in subjecting the tailings or ore to the action of a solution containing sulfuric acid and primarily a compound of nitrogen, capable of liberating nitric oxid, and to the action of a higher oxid or oxids produced and repeatedly reproduced by supplying air or oxygen under pressure to the liberated nitric oxid and to the higher oxid or oxids which have been reduced by acting on the tailings or ore and are confined in the presence of the solution until the metal contained in the tailings or ore is dissolved in the solution, separating the matrix or earthy matter from the solution, precipitating the copper from the solution, confining and conducting off the remaining nitrous fumes for the treatment of other tailings or ore, substantially as and for the purposes set forth.

In witness whereof I hereto affix my signature in presence of two witnesses.

EDWARD FINK.

Witnesses:
 ALICE E. GOSS,
 CHAS. L. GOSS.